(12) United States Patent
Hornburg

(10) Patent No.: US 6,190,791 B1
(45) Date of Patent: Feb. 20, 2001

(54) PROTON EXCHANGE MEMBRANE (PEM) FUEL CELL SYSTEM AND PROCESS OF OPERATING SAME

(75) Inventor: Gerald Hornburg, Elchingen (DE)

(73) Assignee: Xcellsis GmbH, Kirchheim/Teck-Nabern (DE)

( * ) Notice: Under 35 U.S.C. 154(b), the term of this patent shall be extended for 0 days.

(21) Appl. No.: 09/208,991

(22) Filed: Dec. 11, 1998

(30) Foreign Application Priority Data

Dec. 11, 1997 (DE) .............................................. 197 55 116

(51) Int. Cl.$^7$ ...................................................... H01M 8/06
(52) U.S. Cl. .................................................. 429/17; 429/20
(58) Field of Search .................................. 429/13, 17, 20

(56) References Cited

U.S. PATENT DOCUMENTS

| 3,976,507 | * | 8/1976 | Bloomfield | 429/17 |
| 4,128,700 |   | 12/1978 | Sederquist | 429/17 |
| 4,678,723 | * | 7/1987 | Wertheim | 429/17 |
| 4,973,528 | * | 11/1990 | Sanderson | 429/17 X |
| 5,084,362 | * | 1/1992 | Farooque | 429/20 X |
| 5,198,311 | * | 3/1993 | Nakazawa et al. | 429/20 |
| 5,360,679 |   | 11/1994 | Buswell et al. | 429/19 |

FOREIGN PATENT DOCUMENTS

| 40 21 097 A1 | 1/1992 | (DE) . |
| 40 32 993 C1 | 5/1992 | (DE) . |
| 43 18 818 A1 | 12/1994 | (DE) . |
| 44 46 841 A1 | 7/1996 | (DE) . |
| 0 629 013 A2 | 12/1994 | (EP) . |
| 0 729 196 A1 | 8/1996 | (EP) . |
| 60-28173 | 2/1985 | (JP) . |
| 4-144066 | 5/1992 | (JP) . |
| 5-129029 | 5/1993 | (JP) . |
| 8-241724 | 9/1996 | (JP) . |
| 8-338260 | 12/1996 | (JP) . |

OTHER PUBLICATIONS

J. C. Amphlett et al., "System Analysis of an Integrated Methanol Steam Reformer/PEM Fuel Cell Power Generating System," Proceedings of the 27th Intersociety Energy Conversion Engineering Conference, P–259, vol. 3, San Diego, California, Aug. 3–7, 1992. pp. 3.343–3.348.

* cited by examiner

Primary Examiner—Stephen Kalafut
(74) Attorney, Agent, or Firm—Evenson, McKeown, Edwards & Lenahan, P.L.L.C.

(57) ABSTRACT

A proton exchange membrane fuel cell system includes a proton exchange membrane fuel cell; a first compressor for compressing the process air supplied to the fuel cell; a first expander coupled with compressor for driving the first compressor; and a catalytic burner as the heat source. The cathode offgas from the fuel cell is fed to the catalytic burner as an air supply and the expander is operated by the exhaust air from the catalytic burner. A portion of the gas from the burner is expanded in a second expander, which is coupled to a second compressor which further compresses the air from the first compressor.

10 Claims, 3 Drawing Sheets

PROTON EXCHANGE MEMBRANE (PEM) FUEL CELL SYSTEM AND PROCESS OF OPERATING SAME

BACKGROUND AND SUMMARY OF THE INVENTION

This application claims the priority of German Patent Application No. 197 55 116.5, filed Dec. 11, 1997, the disclosure of which is expressly incorporated by reference herein.

The present invention relates to a fuel cell system comprising a proton-conducting electrolyte membrane (i.e., proton exchange membrane) and a method for operating the proton exchange membrane (PEM) fuel cell system.

In EP 0 629 013 B1 and DE 43 18 818 A1, a fuel cell system is described in which the fuel cell is supplied with process air by a compressor driven by an electric motor. To recover the energy contained in the exhaust air from the fuel cell, the compressor is also coupled with an expander. For this purpose, the compressor and expander are mounted on the same shaft. A fuel cell system according to DE 40 21 097 A1 is similarly structured, in which the exhaust air from the fuel cell is conducted to an expansion turbine. The expansion turbine is coupled with a fresh air compressor for supplying air to the fuel cell.

In known fuel cell systems, a catalytic burner is provided as a heat source to which fuel is supplied in the form of (1) moist anode offgas ($H_2$ and $CO_2$) from the fuel cell, and (2) methanol.

When compressing process air to the usual working pressure of 3 bars for example, a portion (e.g., approximately 20%) of the power developed by the fuel cell is required for compression. When energy recovery is used in the expander, this percentage drops to about 10 to 15%. Thus, the air supply of the fuel cell still contributes significantly to reducing the efficiency of the system.

At the same time, in order to lower costs and volume, there is a need for higher working pressures on the cathode side (i.e., air side) in order to build a smaller fuel cell having narrower gas channels and to achieve a higher area-related power yield in the fuel cell.

A method of operating a fuel cell system is described in DE 44 46 841 A1 in which both the anode offgas and the exhaust air from the fuel cell are fed to the catalytic burner.

A system for combined generation of electrical and mechanical energy is disclosed in DE 40 32 993 C1. The combustion gases generated in a burner supplied with a gas containing oxygen and a gas containing hydrogen are used to recover mechanical energy in a gas turbine connected downstream. The mechanical energy generated is partly used to drive a compressor to compress the gas containing oxygen that is supplied to the burner. The system also comprises a fuel cell for generating electrical energy whose anode offgas containing hydrogen is fed to the burner.

The goal of the present invention is to provide a PEM fuel cell system and a method for operating a PEM fuel cell system with a high efficiency.

According to the present invention, the expander power can be increased significantly if the expander is supplied with a higher air mass flow; a higher temperature; and possibly a higher pressure. Increasing the air mass flow and the temperature is accomplished according to the present invention by (1) initially supplying the air at the cathode outlet of the PEM fuel cell as the air supply to the catalytic burner before expansion; and (2) operating the expander with the exhaust air from the catalytic burner. The cathode offgas is depleted of oxygen by the fuel cell reaction, but still contains sufficient quantities of oxygen for the reaction in the catalytic burner. With this arrangement, the mass flow guided to the expander is elevated by comparison with known devices because fuel (usually moist anode offgas and methanol) is supplied to the catalytic burner, whose reaction products thus pass into the expander. At the same time, the entire air mass flow supplied to the expander is raised from the fuel cell temperature (typical temperature for PEM fuel cells is approximately 80° C.) to the working temperature of the catalytic burner (e.g., approximately 350° C.). With the mass flow thus heated, a suitable expander designed for these temperatures can be operated directly.

In one advantageous embodiment, this mass flow can also be utilized for preheating the cathode offgas before it enters the catalytic burner.

As a result of the additional energy input to the expander in the form of heat and mass flow, its performance is increased to the point where the compressor drive (e.g., electric motor and rectifier) can be made much smaller. With an optimum adjustment of the pressure level and/or additional supply of combustion gas in the catalytic burner, the compressor drive can even be eliminated entirely.

In PEM fuel cell systems in which the combustion gas for the fuel cells is generated by a high-pressure gas-generating system (for example, in methanol reformation), a further opportunity is provided for increasing the expander power and/or lowering the compressor power, in which the pressure level is increased by means of a second compressor stage upstream from the cathode input of the PEM fuel cell. The second compressor stage is operated by expansion of the gas that is present in the high-pressure gas-generating system, with the gas pressure dropping from the system pressure of the high-pressure gas-generating system (greater than 15 bars, especially between 20 and 30 bars) to the working pressure of the catalytic burner (approximately 3 bars). The expanded gas, after passing through the second compressor stage, is supplied to the catalytic burner thus increasing the mass flow supplied to the expander of the first compressor stage. The second compressor stage can be designed in the form of a compressor coupled with an expander without a motor or a turbocharger.

With this design, not only is the electrical compressor power reduced through increased system efficiency and smaller size, but the efficiency and size of the fuel cell are also positively influenced as well.

Other objects, advantages and novel features of the present invention will become apparent from the following detailed description of the invention when considered in conjunction with the accompanying drawings.

DETAILED DESCRIPTION OF THE DRAWINGS

Figure 1:
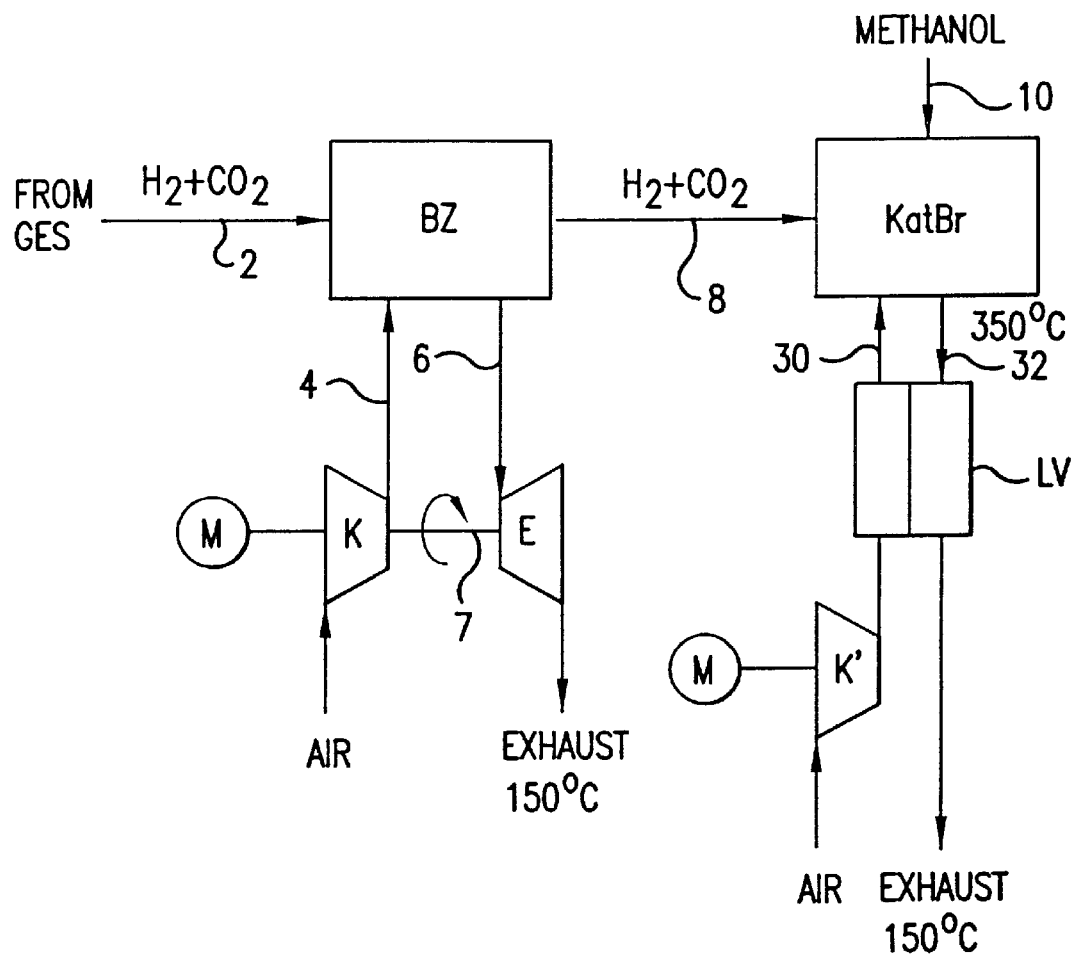
FIG. 1 shows a prior art fuel cell system.

FIG. 1 shows a known fuel cell system. It comprises the PEM fuel cell BZ with the supply line 2 for the combustion gas, for example a mixture of $H_2$ and $CO_2$, which is produced in a separate gas-generating system GES as well as the incoming and outgoing lines 4, 6 for the process air. The process air, before entering fuel cell BZ, is compressed by a compressor K driven by a motor M. To recover the energy contained in the exhaust air from fuel cell BZ, an expander E is located in the exhaust air line 6 which is coupled with compressor K. Expander E and compressor K are mounted on the same shaft 7.

In addition, a catalytic burner KatBr is provided that acts as a heat source for the system. It is supplied with fuel through line 8 with moist anode offgas from fuel cell BZ, for example $H_2$ and $CO_2$ and with methanol through line 10. The oxygen that is also required for the reaction in the burner KatBr is supplied through air supply line 30 after compression in compressor K'. The exhaust air from the burner KatBr in line 32 has a temperature of 350° C. and is used for preheating the air that is supplied to the burner (air preheater LV). On leaving the air preheater LV, the exhaust air is still at a temperature of about 150° C. It has not been possible previously to use this heat further in the system.

Figure 2:
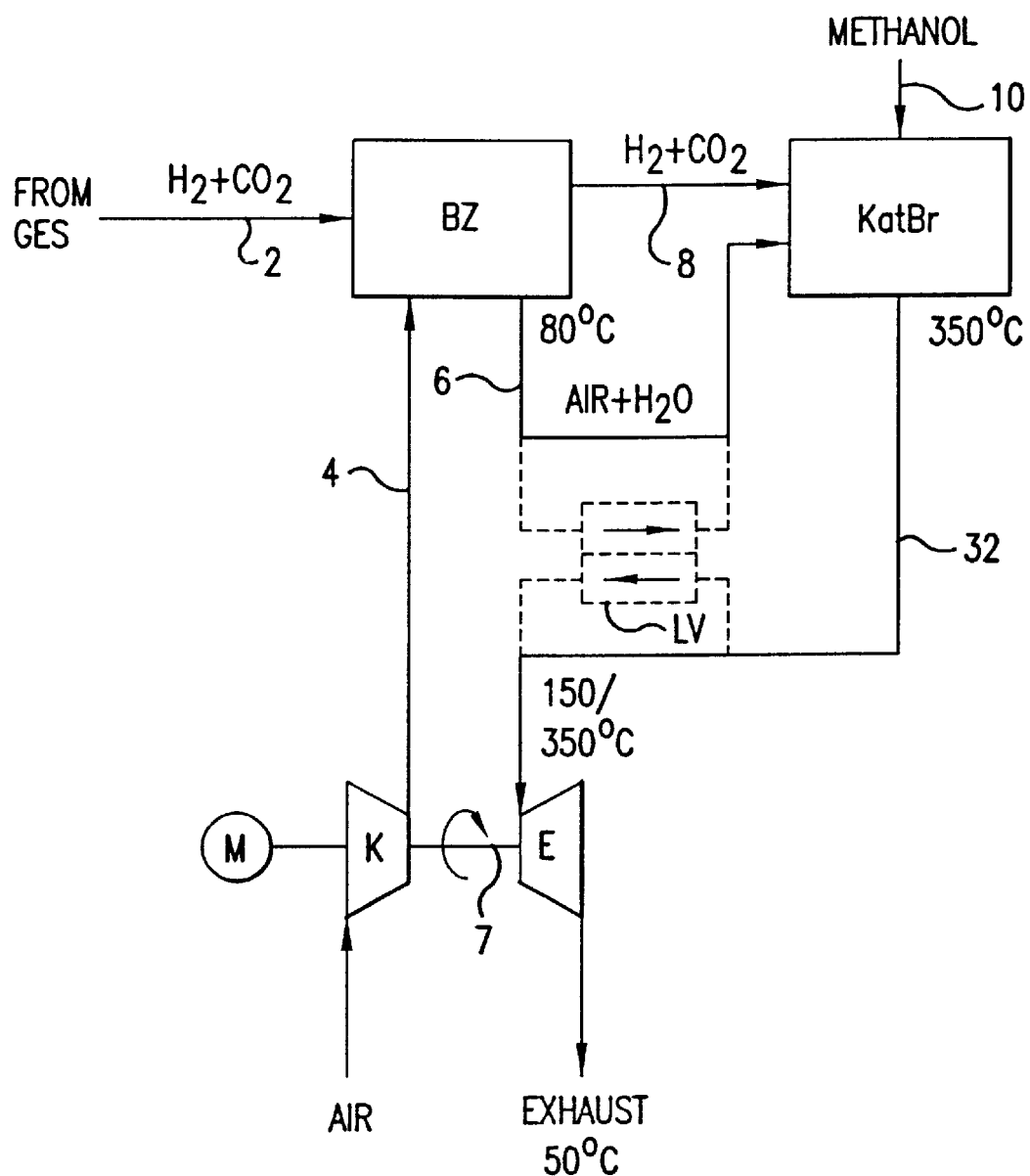
FIGS. 2 and 3 each show an embodiment of a fuel cell system according to the present invention.

FIG. 2 shows an embodiment of the system according to the present invention. The combustion gas for the PEM fuel cell is generated in this embodiment by a low-pressure gas-generating system GES, for example by CO oxidation and supplied through line 2 to the fuel cell BZ. In contrast to the system according to FIG. 1, the exhaust air is not expanded immediately at the cathode output of fuel cell BZ, but is supplied through line 6 to the catalytic burner KatBr where it serves as the air supply. The exhaust air from catalytic burner KatBr is sent through line 32 to the expander E that is coupled with compressor K. Compressor K and expander E are mounted on the same shaft 7. Optionally, a portion of the exhaust air from the burner KatBr can be used for preheating the air stream that is supplied to the burner. The corresponding air preheater LV is drawn in dashed lines. The exhaust air from fuel cell BZ, which has a temperature of about 80° C. at the cathode output of the fuel cell, is heated in burner KatBr to about 350° C. The exhaust air of burner KatBr, depending on the preheating of the air in air preheater LV, has a temperature between 150 and 350° C. on entering expander E. After leaving expander E, the temperature is about 50° C. The exhaust air from the burner KatBr leaves the system at a much lower temperature than in the known systems. At the same time, a higher mass flow is supplied to the expander which also has a higher temperature. The result is a much greater total efficiency of the system.

Figure 3:
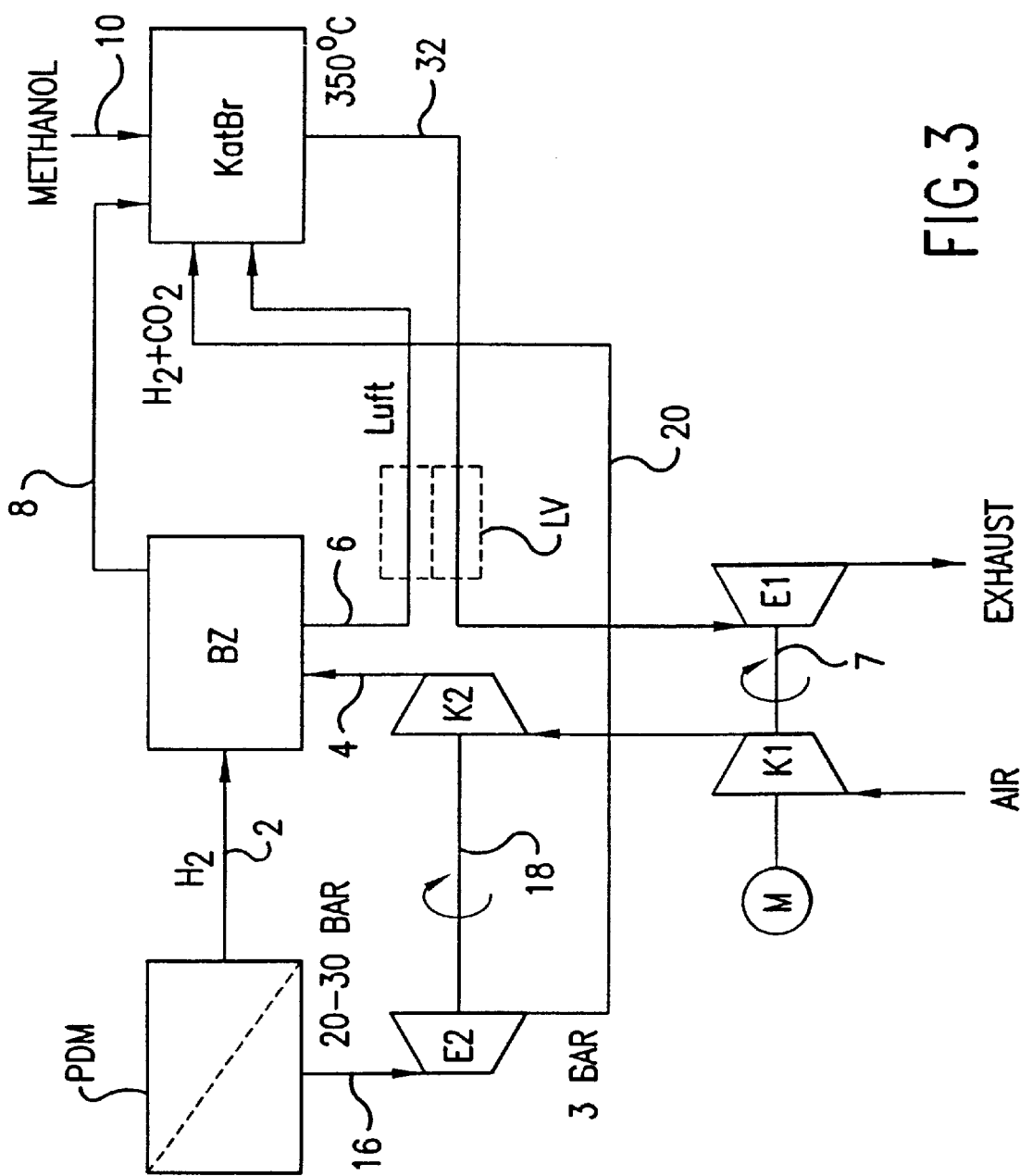

FIG. 3 shows another embodiment of the PEM fuel cell system according to the present invention. In this system, the combustion gas for the PEM fuel cell BZ is generated by a methanol reformation reaction using a high-pressure gas-generating system. The high-pressure gas-generating system includes, for example, a Pd membrane unit PDM. The combustion gas ($H_2$) is guided through line 2 into the fuel cell BZ. The process air supplied to fuel cell BZ, as in the embodiments described earlier, is compressed by a compressor K1. As shown in FIG. 2, here again the exhaust air from the PEM fuel cell BZ is supplied through a line 6 to the catalytic burner KatBr to supply it with air, and the offgas from the burner, possibly with air preheating (air preheater LV, drawn by dashed lines), is fed through line 32 to expander E1 coupled with compressor K1, which are mounted on the same shaft 7. To further increase the expander power or to lower the compressor power in this embodiment, a second compressor stage is provided which consists of compressor K2 and an expander E2 coupled therewith. Compressor K2 and expander E2 are mounted on a common shaft 18. Through line 16 the gas is expanded from the Pd membrane unit PDM of the high-pressure generating system in which a pressure prevails that is higher than 15 bars, and preferably between 20 and 30 bars, to the system pressure of the catalytic burner (approximately 3 bars) KatBr. The expanded gas is then fed through line 20 to catalytic burner KatBr where it serves as the primary fuel ($H_2$ and CO) for the burner reaction. Optionally, the catalytic burner can also be fed with fuel from line 8. Since the expander E2 of the second compressor stage is operated by the expansion of the gas in the gas-generating system, no additional drive is required for it. With the design described, not only is the system efficiency increased, but the efficiency and size of the fuel cell are modified positively.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating a proton exchange membrane fuel cell system, comprising:
   generating a combustion gas comprising hydrogen and carbon monoxide in a gas-generating system;
   guiding the hydrogen into a proton membrane fuel cell;
   compressing air with a first compressor;
   supplying the compressed air to the proton exchange member fuel cell, thereby producing a cathode offgas and anode offgas;
   supplying the cathode offgas to a catalytic burner as an air supply, thereby producing exhaust air;
   expanding the exhaust air with a first expander;
   using energy generated from said first expander to drive said first compressor;
   expanding a portion of the combustion gas with a second expander operatively coupled to a second compressor; and
   further compressing the compressed air from the first compressor with the second compressor.

2. The method according to claim 1, wherein the gas from the gas-generating system prior to expanding is at a pressure of more than 15 bars.

3. The method according to claim 2, wherein the gas is at a pressure between 20 and 30 bars.

4. The method according to claim 1, further comprising supplying the expanded gas from the gas-generating system to the catalytic burner as a fuel supply.

5. The method according to claim 1, further comprising preheating the cathode offgas with the exhaust air before it enters the catalytic burner.

6. The method according to claim 1, wherein a temperature of the cathode offgas is about 80° C.

7. The method according to claim 1, wherein a temperature of the exhaust air is about 350° C.

8. The method according to claim 5, wherein after the preheating, the exhaust air has a temperature of between 150–350° C.

9. The method according to claim 1, wherein the expanded exhaust air has a temperature of about 50° C.

10. A proton exchange membrane fuel cell system, comprising:
    a proton exchange membrane fuel cell;
    a high-pressure gas-generating system for generating combustion gas for the proton exchange membrane fuel cell;
    a first compressor;
    a second compressor that compresses air from the first compressor to supply compressed air to the fuel cell;
    an first expander coupled with the first compressor for driving the first compressor;

a catalytic burner as a heat source;
a line connecting the fuel cell and the catalytic burner for supplying cathode offgas from fuel cell to the catalytic burner as an air supply;
a line connecting the catalytic burner to the first expander for supplying exhaust air from the catalytic burner to the first expander;

a second expander operatively coupled to the second compressor; and
a line connecting the gas-generating system to the second expander, wherein gas from the generating system is supplied to the second expander.

\* \* \* \* \*